No. 806,057. PATENTED NOV. 28, 1905.
D. H. BROWN.
ADJUSTABLE HARROW SECTION.
APPLICATION FILED MAY 26, 1904.
2 SHEETS—SHEET 2.
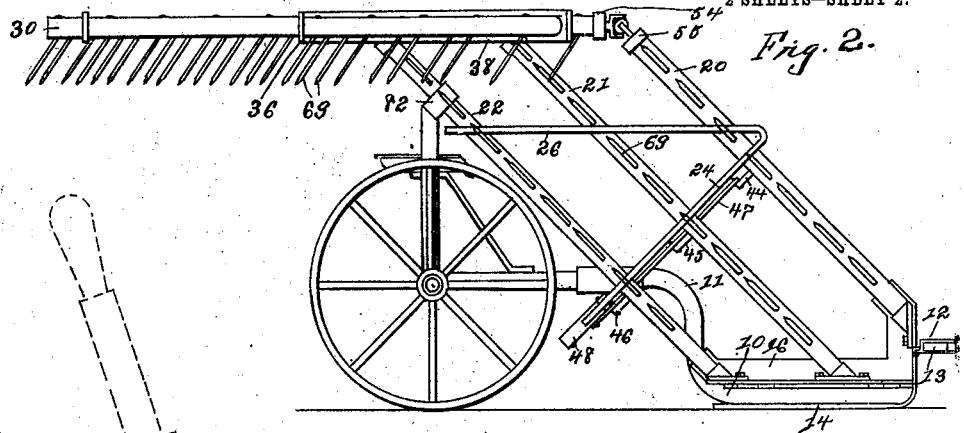
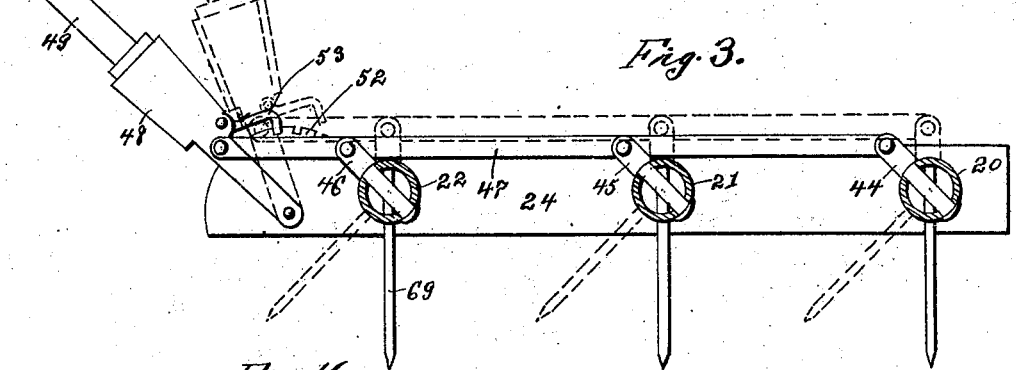
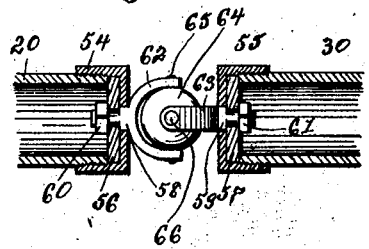
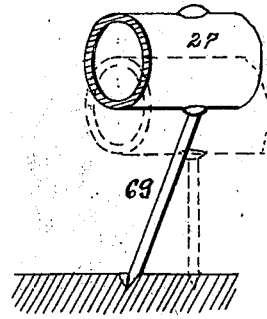
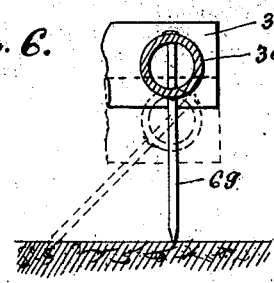
Witnesses
L. L. Leibrock
A. H. Orwig
Inventor Daniel H. Brown
by Thomas G. Orwig,
Atty.

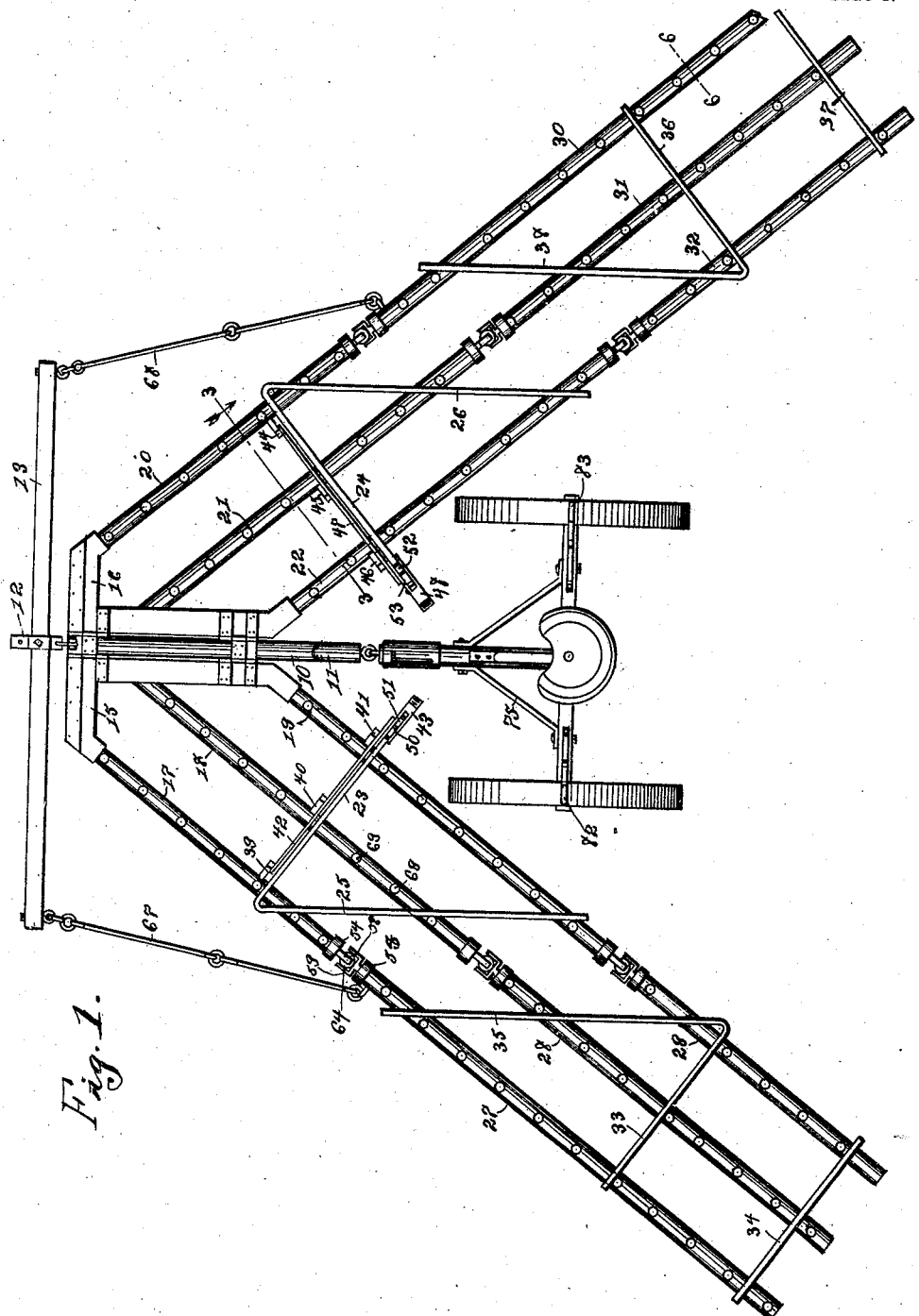

UNITED STATES PATENT OFFICE.

DANIEL H. BROWN, OF FORT DODGE, IOWA.

ADJUSTABLE HARROW-SECTION.

No. 806,057.     Specification of Letters Patent.     Patented Nov. 28, 1905.

Application filed May 26, 1904. Serial No. 209,989.

*To all whom it may concern:*

Be it known that I, DANIEL H. BROWN, a citizen of the United States, residing at Fort Dodge, in the county of Webster and State of Iowa, have invented a new and useful Adjustable Harrow-Section, of which the following is a specification.

My object is to provide means for adjusting a harrow automatically to uneven ground-surfaces as it is advanced in practical use and to connect sections in such a manner that a front section may be in a vertical position and a rear section extended inward at right angles to be carried inoperative and to narrow the complete harrow to facilitate moving it about and passing through gateways.

My invention relates to the sulky-harrow for which United States Letters Patent were granted to me July 11, 1905, No. 794,339; and it consists in the construction, arrangement, and combination of elements and subcombinations, as hereinafter set forth, pointed out in my claims, and illustrated by the accompanying drawings, in which—

Figure 1 is a plan of the complete harrow and sulky combined, showing the operative positions of all of the parts relative to each other. Fig. 2 is a side elevation illustrating the machine with sections of the harrow elevated as required for transportation and inoperative position of the parts. Fig. 3 is a cross-section on the indicated line 3 3 of Fig. 1. Fig. 4 is a detail view illustrating a coupling between harrow-bars. Fig. 5 is a detail view illustrating different positions assumed by a harrow bar and tooth. Fig. 6 is a further detail view illustrating positions assumed by a harrow bar and tooth.

In the construction of the harrow as shown, the numeral 10 designates a draft-bar formed with a gooseneck 11 at its rear end portion and provided with means, such as a coupling 12, for attaching a transverse bar or doubletree 13 to its forward end. A shoe or runner 14 is fixed to and beneath the draft-bar 10 and serves to support said draft-bar slidingly on the surface of the ground. Socket members 15 16 are provided on opposite sides of and hinged to the draft-bar 10. Harrow-bars 17, 18, and 19 are pivoted at their forward ends in sockets in the socket member 15, and harrow-bars 20, 21, and 22 are pivoted at their forward ends in sockets in the socket member 16, said harrow-bars occupying oblique planes and diverging from opposite sides of the draft-bar 10 rearwardly, as shown in Fig. 1. The socket members 15 and 16 are L-shaped, and each one is adapted for pivotally connecting harrow-bars therewith, so that when two sections are connected therewith, as shown in Fig. 1, the harrow-bars will incline rearward in opposite directions, as required to widen the complete harrow at its rear end. Stay-bars 23 24 are mounted on transversely of and at right angles to the harrow-bars 17 18 19 and 20 21 22, and extensions 25 26 of said stay-bars cross and connect said harrow-bars at oblique angles at the rear of the main portions thereof. The stay-bars and extensions thereof are formed of bar metal apertured for the passage therethrough of the harrow-bars, and said harrow-bars loosely traverse said apertures and may be located therein. Harrow-bars 27, 28, and 29 are coupled or hinged to the harrow-bars 17, 18, and 19, respectively, and extend in normal alinement therefrom, and harrow-bars 30, 31, and 32 are coupled or hinged to the harrow-bars 20, 21, and 22 and extend in alinement therewith normally.

The harrow-bars 27, 28, and 29 are connected by stay-bars 33 34, and an extension 35 on the stay-bar 33 crosses and connects said harrow-bars at oblique angles and in a plane parallel with the extension 25. The harrow-bars 30, 31, and 32 are connected by stay-bars 36 37, and an extension 38 on the bar 36 crosses and connects the harrow-bars at oblique angles in a plane parallel to the extension 26. The harrow-bars 27 28 29 and 30, 31, and 32 are loosely mounted in their stay-bars and may be rotated therein.

Crank-arms 39, 40, and 41 are fixed to and extend upward from intermediate portions of the harrow-bars 17, 18, and 19, and a rod 42 connects said crank-arms and is connected to a lever-socket 43, fulcrumed on one end portion of the stay-bar 23. Crank-arms 44, 45, and 46 are fixed to and extend upward from the harrow-bars 20, 21, and 22, and a rod 47 connects said crank-arms and is connected to a lever-socket 48, fulcrumed on one end portion of the stay-bar 24. A lever 49 may be interchangeably employed in the sockets 43 48 to oscillate said sockets and through reciprocation of the rod 42 or 47 and crank-arms oscillate the respective sets of harrow-bars. A rack 50 is formed on or fixed to the stay-bar 23, and a detent 51 on the socket 43 may engage said rack and hold the oscillatory parts in any desired position. A rack 52 is formed on or fixed to the stay-bar 24, and a detent 53 on the socket 48 may engage said rack and hold said socket and its connected parts in any desired position.

In Fig. 4 I illustrate the coupling or connection between two alining harrow-bars, such as 20 30, whereby a hinge or flexible joint is provided between said bars, and yet in the rotation of one bar the other bar will be rotated. The coupling employed comprises caps 54 55, rigidly mounted or firmly screwed on adjacent portions of the harrow-bars with washers 56 57 mounted therein. Each of the caps 54 55 is formed with a central angular opening, and angular yoke-stems 58 59 are mounted therein and are secured by nuts 60 61 on their inner ends. Yokes 62 63 on the stems are arranged at right angles to each other and embrace a ball 64 between the caps, said yokes pivotally connected to the ball by pins 65 66. It will be observed that the pivotal connections between the yokes and ball at right angles to each other provide a universal hinge or coupling between the yokes, and the rigid connections of the yokes to the caps (also rigidly mounted on the harrow-bars) insures the rotation of one harrow-bar coincident with the rotation of the other.

Jointed rods 67 68 connect the outer ends of the transverse bar 13 to the forward ends of the harrow-bars 27 30. Each of the harrow-bars is tubular, and a plurality of teeth 69 are mounted through and project below said harrow-bars, and each tooth extends rearwardly or is inclined in the trend of the bar to which it is attached.

Since the harrow-bars are in planes diverging from the line of advancement and the harrow-teeth incline in the trends of said bars or trail longitudinally of the bars, it follows that in the advance of the harrow the teeth will cut under the surface of the soil and eradicate, scratch out, and destroy weeds or objectionable matter, whereas when the sockets are moved outward and the harrow-bars are rotated the teeth are positioned more nearly vertical and trail slightly in the line of advancement of the machine to the end that said teeth scratch the soil and produce furrows therein without materially cutting under the surface thereof.

In practical use the several parts of the machine may be adjusted, as shown in Fig. 1 of the drawings, and advanced by draft-power attached to the coupling 12 or to the transverse bar 13. When the machine is advanced as above described, the several harrow-teeth cut under the surface of the soil and remove and destroy the weeds growing therein. The several harrow-bars may be adjusted rotatably by manual power applied to the lever 49, used interchangeably in the sockets 43 48, to bring the several teeth more nearly into vertical positions and cause them to scratch or furrow the ground without cutting under the surface thereof materially.

When it is desired to transport the machine from place to place or to store it when not in use, manual force is applied to the harrow-sections alternately at or near the joint in either section to the end of turning the front section into upright positions, as shown in Fig. 2, said front sections articulating on the hinge connections between the socket members 15 16 and the draft-bar 10. The front sections of the harrow are retained in upright positions by engagement of the harrow-bars 19 and 22 in the hooks 82 83, respectively. When the front sections are turned into the upright positions, (shown in Fig. 2,) the rear sections of the harrow are maintained horizontally, but at a material elevation from the ground, the rear sections flexing relative to the front sections by reason of the joints between them, as illustrated in detail in Fig. 4. In either position the harrow-sections are braced and sustained by the stay-bars 23 24 and 33 36 and their extensions and the end bars 34 37.

Having thus set forth the purpose of my invention and the manner of constructing and combining harrow-sections adapted to be adjustably, detachably, and advantageously connected with a sulky, the practical operation and utility thereof will be obvious to persons familiar with the art to which it pertains.

What I claim as new, and desire to secure by Letters Patent, is—

1. In an adjustable harrow, a draft-bar, a runner fixed to its front end and L-shaped socket members hinged to the sides of the front end of the draft-bar and harrow-sections pivotally connected with the socket members, arranged and combined as shown and described for the purposes stated.

2. In an adjustable harrow, a draft-bar, a runner fixed to its front end, a doubletree connected with the front end of the runner and L-shaped socket members hinged to the sides of the front end of the draft-bar and harrow-sections pivotally connected with the socket members, arranged and combined as shown and described for the purposes stated.

3. In an adjustable harrow, a draft-bar, a runner fixed to its front end and L-shaped socket members hinged to the sides of the front end of the draft-bar and jointed harrow-bars pivoted to said socket member, arranged and combined as shown and described for the purposes stated.

4. In an adjustable harrow, a draft-bar, a runner fixed to its front end, L-shaped socket members hinged to the sides of the front end of the draft-bar, jointed harrow-bars pivoted to said socket member and means to adjust the jointed harrow-bars in the L-shaped sockets, arranged and combined to operate in the manner set forth, for the purposes stated.

DANIEL H. BROWN.

Witnesses:
C. O. HAMILTON,
L. J. BROWN.